United States Patent Office 3,137,584
Patented June 16, 1964

3,137,584
PROCESS FOR THE MANUFACTURE OF BORON CARBIDE MOLDING POWDERS
Guy H. Fetterley, deceased, late of Chippawa, Ontario, Canada, by James A. Pollard, executor, St. Catharines, Ontario, Canada, assignor to Norton Company, Worcester, Mass., a corporation of Massachusetts
No Drawing. Continuation of application Ser. No. 393,941, Nov. 23, 1953. This application May 22, 1961, Ser. No. 112,174
1 Claim. (Cl. 106—43)

This application is a continuation of pending application Serial No. 393,941, filed November 23, 1953, now abandoned.

The object of this invention is to provide a molding powder that meets the following requirements:

(a) It can be made economically and in commercial quantities from the crude boron carbide prepared according to U.S. Patent No. 2,155,682.

(b) It can be molded into solid bodies by standard hot pressing methods with minimum rejections for either low density or breakage in the mold.

(c) The molded pieces will be extremely hard and durable because they are high in density (low in porosity), free from excessive grain growth and contain a minimum of free carbon which usually appears as graphite inclusions.

Other objects will be in part obvious or in part pointed out hereinafter.

According to U.S. Patent No. 1,897,214, issued on application of the late Raymond R. Ridgway, boron carbide of the best quality was determined to be $B_4C$. According to Ridgway's later U.S. Patent No. 2,027,786, which describes the molding of boron carbide, powders having as nearly as possible the formula $B_4C$ should be used. The method of making boron carbide of the formula $B_4C$ is fully described in his U.S. Patent No. 2,155,682, and a furnace suitable for molding this material into solid bodies is described in his U.S. Patent No. 2,125,588.

While the procedures described by Ridgway were used successfully on a laboratory and small commercial scale, and produced molded boron carbide pieces of excellent quality, these procedures also led to a number of difficulties which are discussed below:

Crude boron carbide, made according to U.S. Patent No. 2,155,682, was found to have a variable B/C ratio, here defined as the number of atoms of boron per atom of carbon. This is what is called a mole ratio, in this case the boron to carbon mole ratio in the specification referred to as the "B/C ratio" for short. After each run the furnace was unloaded and the dense, crystalline, well-reacted portion was sorted out as product, the remainder being returned to the furnace as part of the raw material for subsequent runs. When an average sample of this product was analyzed it might show a B/C ratio from 3.5 to 4.5 or even higher, depending on normal variations in the raw materials and furnacing conditions, not all of which can be controlled under conditions of full scale production without incurring excessive costs. If it were then necessary to reject, as raw material for making molding powder, all lots that did not show a B/C ratio of exactly 4.0, the cost of molding powder would be prohibitively high. Recent studies of the boron-carbon system indicate that this variation in B/C ratio is to be expected, because $B_4C$ can hold considerable quantities of boron in solid solution when excess boron is present, and can also dissolve carbon at high temperatures when excess carbon is present. The excess carbon is almost all precipitated as included graphite when the $B_4C$ cools, but appears in the analysis because it is intimately mixed with the $B_4C$.

Molding powder of theoretical composition, having four atoms of boron to each atom of carbon was found to be difficult to mold with high yields of satisfactory pieces. Even with the most precise possible control of temperature and pressure in the molding process, many of the finished pieces would be undesirably high in porosity, or would be found to be broken when they were removed from the mold. It is now believed that these difficulties were caused by random fluctuations in the B/C ratio of individual particles of powder in contact with the wall of the graphite mold. These particles having a B/C ratio in excess of 4.0 reacted with the mold wall at the molding temperature and adhered very tightly to the wall. Because of this adherence, the powder could not slide freely along the wall as it must if it is to be compacted to a high density.

In U.S. Patent No. 2,027,786, it is stated that the molding powder should be fine enough to pass a 200 mesh screen, but no lower limit was placed on the particle size. It was later found, however, that powders having all the particles finer than ten microns were very difficult to mold, because isolated crystals in the molded piece would grow to large size, easily visible to the naked eye on the broken surface. This condition is highly undesirable, since the hardest and most durable molded pieces show a microstructure in which practically none of the individual crystals exceed 50 microns in diameter. Usually, when such coarse crystallization occurred in the molding process, the molded pieces were very weak and were frequently found to be broken when removed from the mold.

Powders prepared according to U.S. Patent No. 2,027,786 were found to be fluffy and hard to handle. Dust losses were high and the powders were hard to pack into a mold. Excessively long molds were required to accommodate the powder after loading but before heating, increasing the cost of molds. In addition, labor costs were increased by the amount of effort required to pack the powder in the mold.

The difficulties described above were overcome by developing the following techniques:

It was found that crude lots having B/C ratios from 3.65 to 4.05 could be used to make a satisfactory grade of molding powder, providing the final powder was made up by blending analyzed sub-lots in such a way that the average B/C ratio fell within a narrow range, discussed in the next paragraph. This discovery made it possible to accept for the manufacture of molding powder a large proportion of the lots of crude boron carbide that were produced commercially.

As noted above, it was found that powder within an average B/C ratio of 4.0 or higher was difficult to mold. Furthermore, if the B/C ratio was lower than 3.8 flakes of graphite appeared in the molded pieces, reducing their hardness and strength. A critical range of B/C ratios was found, from 3.8 to 3.9, such that the powder was much easier to mold than that having a B/C ratio of 4.0 and at the same time produced molded pieces substantially free from graphite inclusions and having a degree of hardness and durability equal to that shown by pieces of theoretical composition.

Excessive grain growth during the molding operation was found to be a function of the size of the powder particles. The optimum size for molding standard items was found to be 80–90% from 5 to 50 microns, with less than 12% under 5 microns and none over 100 microns. Finer powders are used occasionally to obtain special properties in the molded pieces, but only at the cost of greatly increased difficulty of molding.

Excessive fluffiness, low bulk density and resulting handling difficulties were overcome by adding to the finished powder 1% of water with a very small amount of wetting agent such as Aerosol OT. Aerosol OT is the trade name of a commercially available wetting agent, which is a sodium salt of benzene sulphonic acid.

The molding powder is made according to the invention, by following the technology of the aforesaid U.S. Letters Patent, Nos. 1,897,214 and 2,155,682 and thereby producing a number of lots of crude boron carbide. An average sample of each lot is analyzed chemically, and for each lot the B/C ratio and total percentage of B+C are noted. Any lot having B+C less than 98% is rejected, and also any lot having a B/C less than 3.65 or more than 4.05 is rejected. The rejected lots can be used for purposes other than the preparation of molding powder, such as the manufacture of abrasive grains or use as a raw material for the synthesis of other boron compounds. In this way profitable use can be made of practically all the crude boron carbide that is made in the crude furnaces, and at the same time get an ample supply of raw material for the manufacture of molding powder.

A typical manufacturing operation to make molding powder from the crude boron carbide follows. Note that the quantities given in the example are determined in practice by convenience in handling and by the capacity of the equipment on hand.

Each lot of crude boron carbide is passed through a jaw crusher to break the lumps down to about ½ inch and finer. Then this material is passed through a roll crusher and 24 mesh wire screen. The roll crusher and screen are operated in closed circuit, the oversize returning from the screen to the crusher, so that all the product eventually passes through the screen.

Then a 70 lb. batch is selected, which may be all taken from one of the above-mentioned crude lots or may be made up from two or more of them. At this stage it is convenient to select lots which will yield a normal balance of B/C ratios in the inventory of molding powder. Thus if the inventory contains more powder having a B/C ratio below 3.85 than above it, lots with a B/C ratio above 3.85 are selected until the inventory comprises lots that are evenly balanced in B/C ratio about the average of 3.85.

The 70 lb. batch is placed in a steam-jacketed kettle with enough water to cover the solid, boil the water slowly with occasional stirring for two hours, and allow it to settle for one hour. The hot water removes boric acid, graphite, wood chips, etc. which are skimmed off the top during the washing.

After draining off excess water, the 70 lbs. of washed crude boron carbide is transferred to a ball mill with about 7 gallons of water. The mill consists of a steel drum about 15 inches long and 30 inches in diameter and contains 500 lbs. of ½ inch steel balls. After sealing, the mill is rotated for 12 hours at 30 r.p.m. About 6 lbs. of balls is used up in this operation.

The mill is provided with a port about 12 inches square. This port is sealed during milling by a steel plate. At the end of 12 hrs. of milling, this plate is removed and a heavy steel screen, having openings ⅛ inch square, is bolted in its place. A shallow steel tank on casters is rolled under the mill, which is then turned so that the slurry runs out into the tank but the balls are retained by the screen. The mill is finally flushed out with 3 gallons of water.

The next steps are acid treatment and water washing to remove the iron added by the ball milling. The shallow steel tank, containing the slurry, is rolled to the acid-treating tank, which is an open-topped vertical cylinder 30 inches in diameter and 45 inches high, made of lead-lined steel. The slurry is pumped into this tank through a 66 mesh screen, oversize caught on the screen being returned to the ball mill with the next batch.

The slurry is stirred rapidly in the bottom of the tank with a motor-driven stirrer having a long shaft, and 20 lbs. of 96% sulphuric acid is added slowly. This operation must be done carefully, since the tank fills with foam, and a large volume of hydrogen is evolved. The hydrogen is inflammable and is contaminated with other gases, some of which are poisonous, so an efficient hood must be provided to exhaust these gases from the working space.

At the end of 3 hrs., about 75 gallons of water is added, filling the tank to ¾ of its capacity. The stirrer is run for 12 hrs. more, then turned off, and the solids are allowed to settle for 4 hrs. The clear liquid is siphoned off and discarded, leaving 3–4 inches of thick slurry in the bottom. About 10 gallons of water and 20 lbs. of 96% sulphuric acid are added, and steam is passed into the slurry with stirring to heat it to boiling for ¾ hr. About 75 gallons of water is added, and the resulting dilute slurry is stirred for 12 hrs., then allowed to settle for 12 hrs. The slight acidity promotes settling. The clear liquid is siphoned off and discarded as before.

About 10 gallons of water is again added to the thickened slurry. While the solids are kept in suspension by the stirrer, the liquid mixture is pumped into the filter press and washed with water for two hours. The rate of delivery of slurry and wash water to the press is determined by the pump, which maintains a practically constant delivery of two gallons per minute. Compressed air is then passed through the filter cake for two hours to dry it partially.

The filter press is dismantled and the filter cake removed and broken up. The partly dried material is placed in flat trays and loaded into a vacuum dryer. It is heated to about 100° C. with steam under a vacuum of about 28 ins. of mercury for 3½ hrs.

The lumpy product from the drying process is broken down to a fine powder by a light milling in a small buhr mill.

By repeating this process many times a stock of molding powder batches, each weighing about 70 lbs. is accumulated. Since all the raw materials were selected to have a B/C ratio of between 3.65 and 4.05, these batches will also have B/C ratios in this range. A sample of each batch is analyzed for boron, carbon, and iron extractable with hot hydrochloric acid. Each batch must show B+C at least 99%, B/C ratio between 3.65 and 4.05, and extractable iron not more than about 0.1%. Rejections are unusual at this stage of the process, but occur occasionally. Each batch is stored separately and a record of its B/C ratio is kept for use in selecting powder for blending.

The molding powder is now finished as far as inventory is concerned and may be stored indefinitely. One further operation is necessary before it can be used for molding, and this operation is preferably performed shortly before the powder is to be used. Certain minor advantages accrue from this manner of operation, since it reduces the danger of particle size segregation from handling, minimizes variations in moisture content from evaporation, and maintains the inventory in a more flexible condition.

To make a 100 lb. lot of molding powder selection of weighed amounts of the batches described above are made in such a way that the average B/C ratio of the lot is between 3.80 and 3.90, as close to 3.85 as is convenient. Then the entire 100 lbs. of powder is placed in a rubber-lined ball mill and thereto is added 1 lb. of water to which has been added one drop of 10% solution of Aerosol OT wetting agent. In the mill are placed 16 lbs. of 1½ inch diameter rubber balls, it is sealed, and rotated slowly for 2 hrs. to insure complete mixing of the powder. The amount of water added to the powder is not critical, but less than ½% is not very effective and over 2% is unnecessary. Preferably the addition is limited to the range ½% to 2% of the weight of powder.

When the mill is opened powder is packaged in paper bags, 5 lbs. to a bag, to minimize particle size segregations, and stored in sealed drums to prevent evaporation of the water that was added.

Boron carbide molding powder having thus been prepared, molded pieces of various shapes can be produced by molding in the apparatus described in Ridgway's U.S. Patent No. 2,125,588 and in his joint U.S. Patent with Bruce L. Bailey, No. 2,150,884. The technology for molding is described in their U.S. Patent No. 2,027,786. Sand blasting nozzles and other nozzles, plug gages and other articles can readily be made. For special molding apparatus, see U.S. Patent to G. R. Watson, No. 2,535,180, and U.S. Patent to G. H. Fetterley and J. W. Knowlton, No. 2,522,046. Using the powder prepared according to my invention the pieces contain little free carbon, have long wear and molding is easy, with few cracked pieces resulting. In short the molding powder herein described is far superior and makes fewer cracked pieces than molding powder which is strictly $B_4C$ or outside the B/C ratio 3.80 to 3.90.

It will thus be seen that there has been provided by this invention a process for the manufacture of boron carbide molding powder in which the various objects hereinbefore set forth togeher with many thoroughly practical advantages are successfully achieved. As various possible embodiments might be made of the above invention and as the art herein described might be varied in various parts, all without departing from the scope of the invention, it is to be understood that all matter hereinbefore set forth is to be interpreted as illustrative and not in a limiting sense.

What is claimed is:

A process for making boron carbide molding powder from masses of reacted boric acid and carbon, comprising selecting from said masses only those masses which show analyses of over 98% boron carbide and a B/C mole ratio of from 3.65 to 4.05, washing said selected masses to remove boric acid, carbon and other impurities, separately ball milling each of said masses, said ball milling being continued for a time period and under conditions to produce a particle size distribution within each mass in which 80% to 90% falls within a range of from 5 to 50 microns with less than 12% of the particles being under 5 microns in size and wherein there are no particles larger than 100 microns, subjecting separately each milled mass to an acid wash by stirring a slurry of the milled particles with slow additions of an acid solution, washing and then drying the acid treated masses, selecting from such independently milled acid treated and dried masses only those masses which upon analysis show a presence of at least 99% boron carbide and which respectively have a B/C mole ratio of from 3.65 to 4.05 and an iron content of not more than 0.1%, breaking down all of the said finally selected and dried masses to fines and blending portions of said masses having different B/C ratios and including in the blend portions of some of said masses which are outside the range of the B/C mole ratio of between 3.80 to 3.90, said mass portions being selected in amounts calculated to produce an ultimate mixture of molding powder fines having a B/C mole ratio of between 3.80 to 3.90 adapted for the production of hot pressed molded products having little free carbon, that are long wearing and have few flaws therein.

References Cited in the file of this patent

UNITED STATES PATENTS

| | | |
|---|---|---|
| 966,399 | Higgens | Aug. 2, 1910 |
| 1,951,133 | DeBats | Sept. 14, 1931 |
| 2,027,786 | Ridgway | Jan. 14, 1936 |
| 2,529,333 | Finlay | Feb. 6, 1956 |

FOREIGN PATENTS

| | | |
|---|---|---|
| 1,116,480 | France | Feb. 6, 1956 |